April 14, 1953     A. W. MALL     2,634,770
PORTABLE TREE-FELLING AND LOG-CUTTING CIRCLE SAW
Filed June 1, 1948     5 Sheets-Sheet 1

April 14, 1953 — A. W. MALL — 2,634,770
PORTABLE TREE-FELLING AND LOG-CUTTING CIRCLE SAW
Filed June 1, 1948 — 5 Sheets-Sheet 3

Inventor:
Arthur W. Mall
By: Zabel and Gritzbaugh
Attorneys

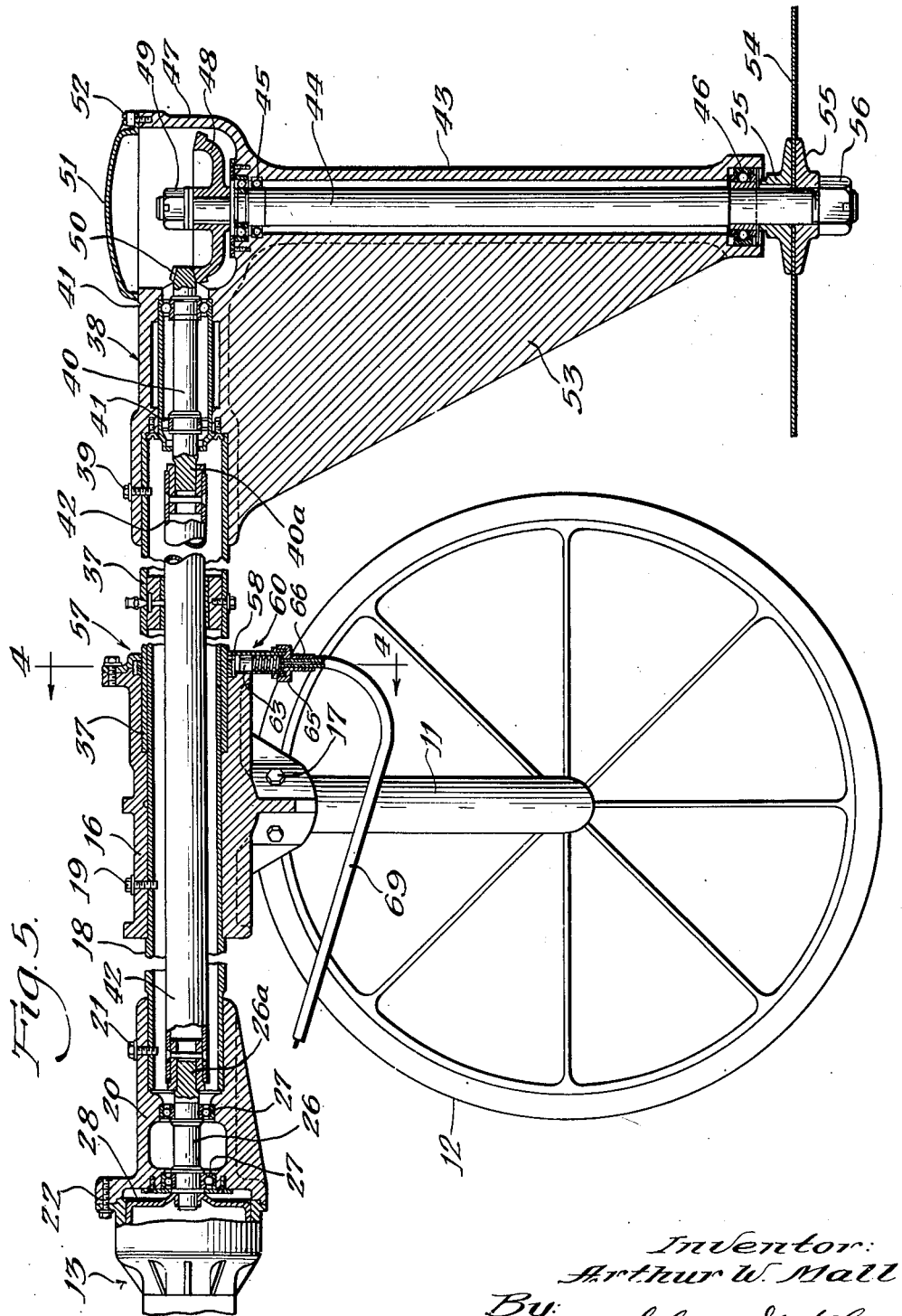

April 14, 1953 A. W. MALL 2,634,770
PORTABLE TREE-FELLING AND LOG-CUTTING CIRCLE SAW
Filed June 1, 1948 5 Sheets-Sheet 5
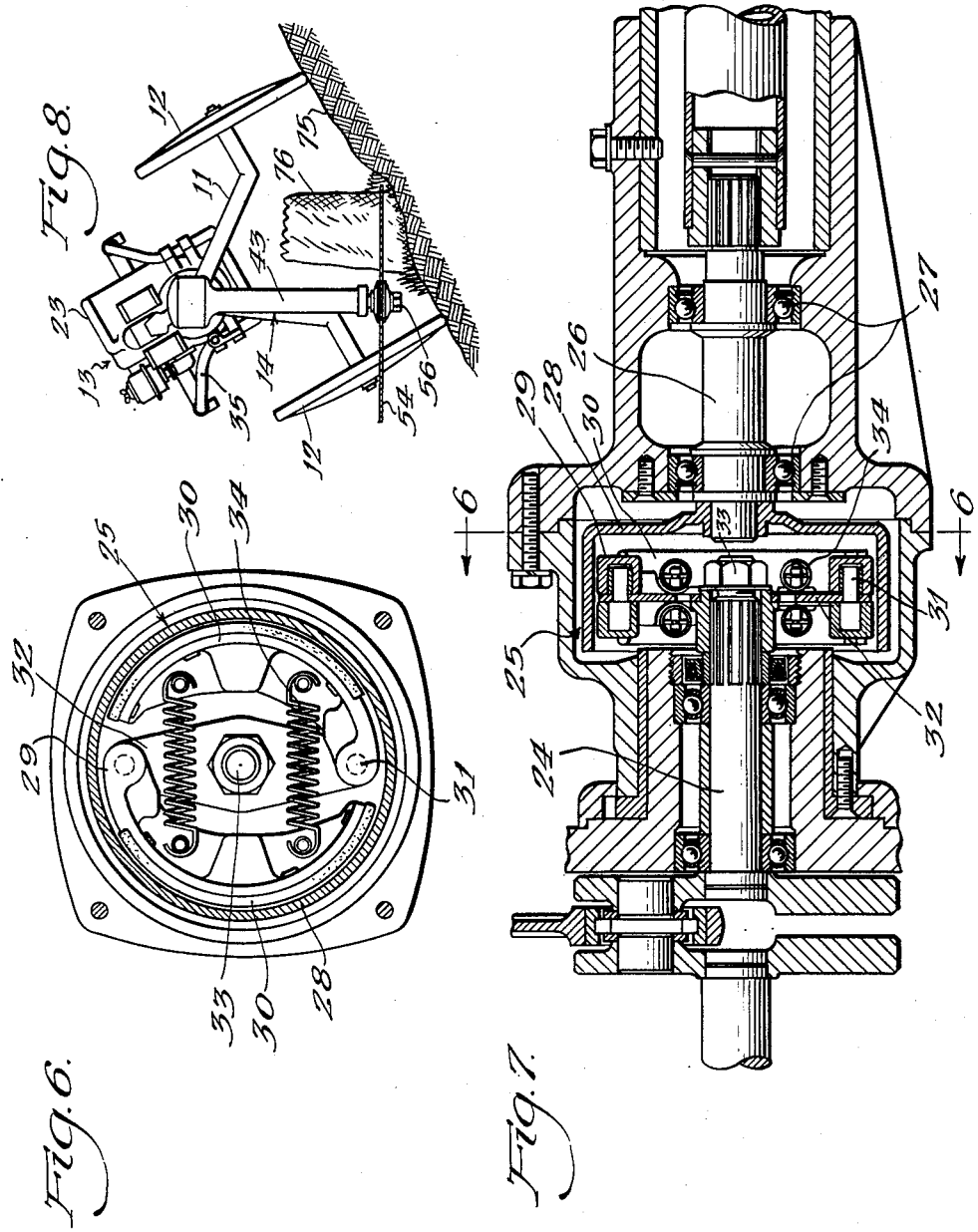
Inventor:
Arthur W. Mall
By: Zabel and Gritzbaugh
Attorneys Patented Apr. 14, 1953

2,634,770

UNITED STATES PATENT OFFICE 2,634,770

PORTABLE TREE-FELLING AND LOG-CUTTING CIRCLE SAW

Arthur W. Mall, Flossmoor, Ill., assignor to Mall Tool Company, Chicago, Ill., a corporation of Illinois Application June 1, 1948, Serial No. 30,357

4 Claims. (Cl. 143—43)

The present invention relates to a portable circular saw of the type that may be used for felling trees and cutting the trees and logs into shorter lengths. The saw comprises an elongated frame mounted on a pair of wheels. The wheels may be disposed substantially midway between the ends of the frame and a power unit is mounted at one end of the frame whereas a circular saw is disposed at the other end. The saw blade rotates about an axis that is disposed at right angles to the long axis of the frame. The entire unit is suited for operation by one person who stands at the motor end of the device and the cutting operation is effected by simply rolling the entire unit on its wheels in a manner similar to a wheelbarrow to feed the rotating saw blade into the wood.

One object of the invention is to provide such a unit wherein all of the drive mechanism is completely enclosed, thereby eliminating as much as possible danger of injury to the person using the saw.

The present device is intended for use in felling trees and clearing land of underbrush and the like and for this purpose the saw rotates in a substantial horizontal plane. For cutting trees and logs into shorter lengths, however, it may be necessary to have the saw blade rotate in some other plane, either vertical or perhaps intermediate.

Another object of the invention is to provide a saw where changes of position of the blade can be brought about by the operator in a simple manner without requiring his changing his position from that required for normal operation of the device.

The foregoing constitute some of the principal objects and advantages of the present invention, others of which will become apparent from the following description and the drawings, in which Fig. 1 is a side elevational view of the complete saw unit embodying the present invention;

Fig. 5 is an enlarged, fragmentary, longitudinal sectional view through the saw, the view being taken along the line 5—5 of Fig. 2;

Fig. 6 is a transverse sectional view taken through the clutch portion of the saw unit, the view being taken on the line 6—6 of Fig. 7;

Fig. 7 is an enlarged, fragmentary, longitudinal sectional view through the saw unit, the view being taken along the line 7—7 of Fig. 2; and Fig. 8 is a more or less diagrammatic view illustrating the present saw in position for operation to cut a tree on the side of a hill.

For purposes of illustration a single embodiment of the present invention has been shown and will be described hereinafter. It is recognized, however, that many modifications may be made in the form of the invention shown without departing from the intended scope and spirit of the invention.

Figure 1:
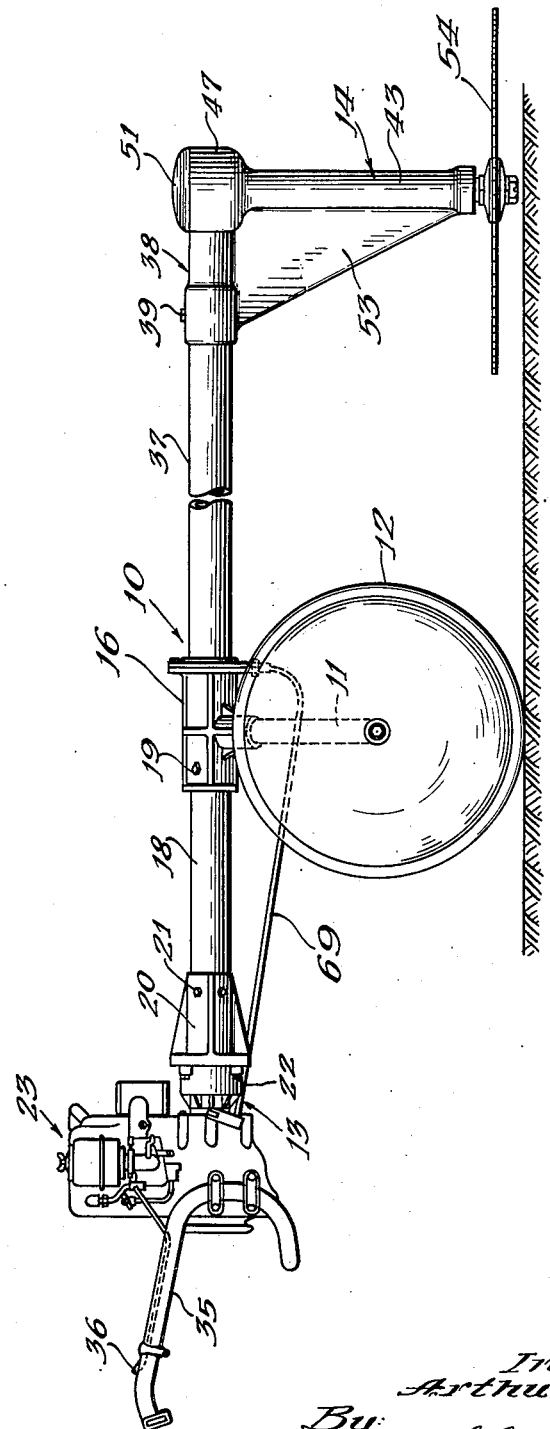
Figure 2:
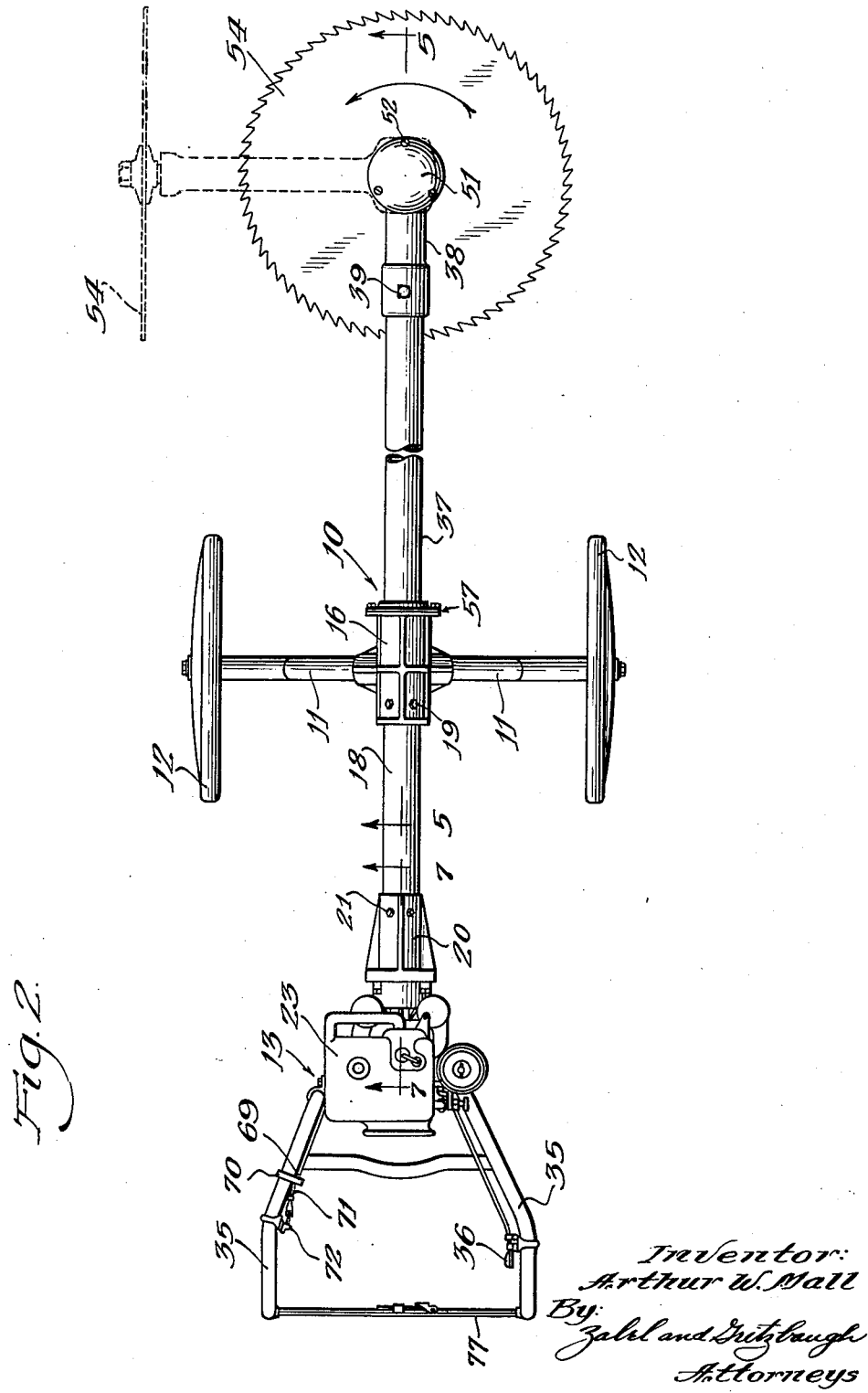
Fig. 2 is a plan view of the unit shown in Fig. 1, the saw blade being illustrated in two positions.
Figure 3:
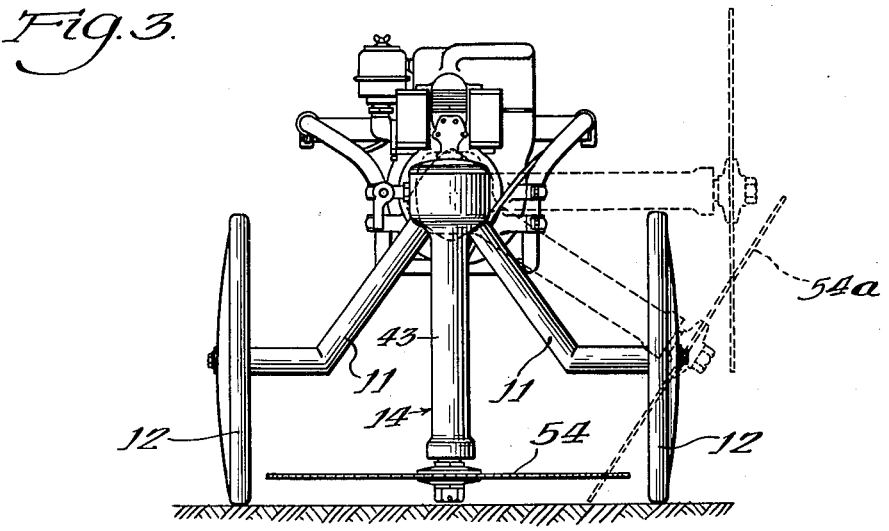
Fig. 3 is a front end view of the saw, the saw blade being illustrated in solid lines in a horizontal position to rotate about a vertical axis and in broken lines in each of two other positions.

Referring now to the drawings and particularly to Figs. 1, 2 and 3, the saw unit comprises a frame generally indicated at 10 that includes a pair of legs 11 on each of which is mounted one of a pair of wheels 12. The frame 10 is elongated and at one end is provided with an engine or motor 13 and at the other end with an arm 14 that is disposed substantially at right angles to the axis of the elongated frame 10. Disposed at the free end of the arm 14 is a circular saw blade 54.

The frame 10 more specifically comprises a sleeve member 16 to which the legs 11 are rigidly secured by means of bolts or the like 17. Mounted in this sleeve 16 and extending rearwardly therefrom is an elongated tube 18 that is rigidly secured to the sleeve by means of screws, one of which is shown at 19 in Fig. 5. A coupling member 20 is fixed by means of screws 21 onto the free end of this tube 18 and the engine or motor unit 13 (Fig. 2) is fixed to the free end of this coupling member 20 by means of screws 22 (Fig. 5).

The engine or motor unit 13 includes the prime mover or engine 23 of any suitable type having an engine drive shaft 24 (Fig. 7) on the end of which may be disposed a centrifugal clutch generally indicated at 25. This engine 23 forms no part of the present invention and, therefore, it is deemed unnecessary to describe in detail the various parts of the engine and the engine drive.

Mounted in rotation with the coupling member 20 is a stub shaft 26 that operates in bearings 27 and on one end of this shaft 26 is a cup shaped clutch element 28 forming the driven member of the centrifugal member 25 (see Figs. 5 and 7). The centrifugal clutch 25 further comprises a centrifugal portion 29 that is mounted on the end of shaft 24 and serves to cooperate with the cup shaped clutch element 28 when the speed of rotation of shaft 24 reaches a predetermined R. P. M. to drive stub shaft 26.

For purposes of illustration this centrifugal portion 29 of the clutch 25 comprises generally clutch shoes 30 (Fig. 6) that are pivoted as at 31 to an arm 32 which in turn is pivoted about an axis 33 that is disposed at the center line of the shaft 24. The shoes 30 are normally held in collapsed condition by means of springs 34. The outer face of each of the shoes 30 is provided with a lining material of fabric or the like that will provide a relatively high coefficient of friction. As the speed of rotation of the shaft 24 reaches a predetermined R. P. M. the clutch shoes 30 are brought into engagement with the inner annular face of the cup shaped clutch element 28 to create a positive drive from the shaft 24 through the clutch 25 to the shaft 26. Shaft 24 is driven directly from the engine 23.

As best shown in Figs. 1 to 3 inclusive a pair of rearwardly extending handle bars 35 is fixed to the engine 23 and they are so spaced that they can be conveniently grasped by the operator of the saw unit. The engine 23 may be gasoline driven and provided with a throttle that is operated by a finger lever 36 that is disposed on one of the handle bars 35.

Mounted in the forward end of the sleeve member 16 and projecting forwardly therefrom is an elongated tube 37 on the free end of which is mounted a cutter assembly member 38. The sleeve 37 is telescoped over the end of tube 18 and is adapted to rotate about the tube 18 and in sleeve 16. The cutter assembly member 38 is fixed to rotate with the tube 37 by suitable screws, one of which is shown at 39 in Fig. 5. Mounted in the upper portion of the cutter assembly member 38 is a horizontally disposed stub shaft 40 that is journalled in suitable spaced bearings 41. One end 40a of this shaft 40 projects into the end of tube 37 and mounted on this projecting end 40a is a rotatable shaft 42 that is disposed inside the tubes 18 and 37. The other end of shaft 42 is mounted on the end 26a of stub shaft 26 that is disposed in the coupling member 20. Thus the stub shaft 40 is driven from the engine 23 through stub shaft 26 and shaft 42.

The cutter assembly member 38 is provided with a downwardly disposed tubular portion 43 in which is mounted a rotatable shaft 44 that is suitably journalled at opposite ends as indicated at 45 and 46. A gear box portion 47 is provided at the upper end of the tubular portion 43 of the cutter assembly member 38 and the shaft 44 projects into this gear box portion. A gear 48 is mounted on the upper end of the shaft 44 and is fixed in place by means of a suitable nut 49 threaded onto the end of the shaft and is adapted to mesh with a pinion 50 that is mounted on the end of stub shaft 40. The gear box member 47 is provided with a removable cover 51 that is secured in place by suitable screws 52. A web 53 serves as a gusset for reinforcing the cutter assembly member 38.

The shaft 44 projects below the lower edge of the cutter assembly member 38 and mounted on this free end of the shaft 44 is a cutter or circular saw blade 54 that is held in place by inner and outer plates 55 that are clamped together by a nut 56 that is threaded onto the end of the shaft.

Thus there is provided a saw unit that is adapted to support a circular saw blade 54 that is rotated with shaft 44 through suitable gears 48 and 50 from an engine drive that includes driven shafts 26, 42 and 40. As shown in Fig. 5 the circular saw blade 54 lies in a horizontal plane and in order to fell a tree or the like, the person operating the saw assumes a position behind the handle bars 35 (Figs. 1 and 2) and pushes the entire unit on wheels 12 so as to feed the rotating saw blade 54 into the tree.

For many purposes it is desirable that the saw blade 54 be disposed in a vertical plane or in some plane other than the horizontal plane illustrated in Figs. 1, 2 and 5, in solid lines. This can very readily be accomplished with the saw unit forming the subject matter of the present invention by merely causing the entire tube 37 together with the saw assembly unit 38 to be rotated in the sleeve 16 until the saw blade is disposed in the desired position. It is, of course, necessary to lock the cutter assembly member 38 when the blade has reached its desired position and for this purpose an indexing and locking assembly generally indicated at 57 in Fig. 5 is utilized.

Figure 4:
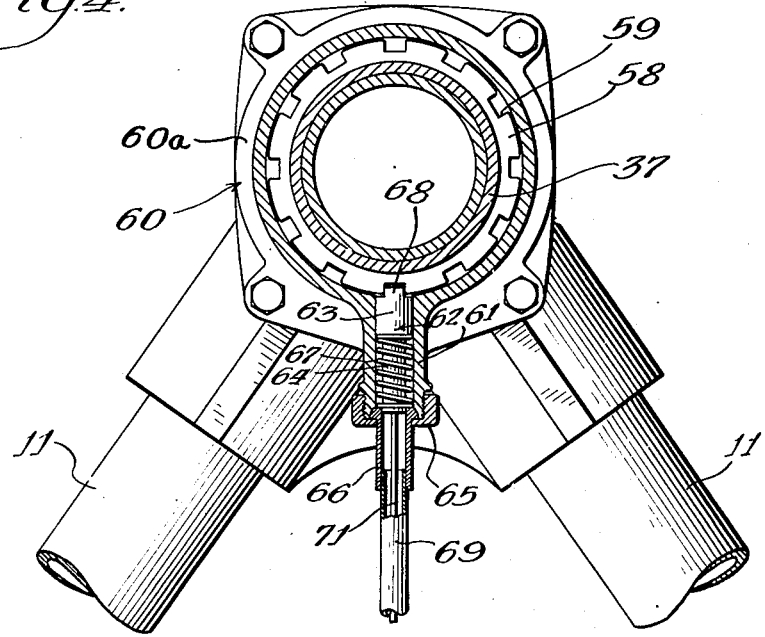
Fig. 4 is an enlarged, transverse sectional view through the saw unit, the view being taken on the line 4—4 of Fig. 5.

This assembly includes an indexing ring 58 shown in Figs. 4 and 5 that is mounted concentrically about the tube 37 and is fixed with respect to this tube. This indexing ring 58 is notched as at 59 about its periphery and for purposes of illustration these notches are disposed at thirty degree intervals about the entire periphery. Surrounding this indexing ring 58 is an indexing pin assembly generally indicated at 60 that includes a clamping ring 60a at the under side of which is a downwardly projecting pin housing 61 in which is mounted an indexing pin generally indicated at 62. This pin 62 includes a pin head portion 63 having a downwardly extending shank 64 of smaller diameter than the head portion 63. A cap 65 is threaded onto the lower end of the pin housing 61 and a nipple 66 is held between the cap 65 and the end of the housing 61. A compression spring 67 is mounted concentrically about the shank 64 of pin 62 and is seated between the pin head 63 and the upper end of the nipple 66. The pin 62 is adapted to slide up and down in the indexing housing 61 but is constantly urged in its upper position shown in Fig. 4 by the compression spring 67. The head portion 63 of the indexing pin 62 is provided with an outwardly projecting tooth or lug 68 that is adapted to project into any of the notches 59 in the indexing ring 58 so as to lock the indexing ring 58 and prevent rotation thereof.

A tube 69 fitted into the open end of the nipple 66 (Figs. 4 and 5) extends rearwardly and terminates at one of the handle bars 35 as indicated in Fig. 2 and is fixed to this handle bar by some suitable clamp 70. Mounted in this tube 69 is a flexible cable 71 that is adapted at one end (Fig. 4) to the lower end of the shank 64 of the indexing pin 62. The other end of this flexible cable 71 projects out through the opposite end of the tube 69 (Fig. 2) and is provided with a hand grasp knob 72 that is readily accessible to the person operating the saw while he is positioned behind the handle bars 35. By the exertion of a pull on the hand grasp knob 72 (Fig. 2), which force is transmitted through flexible coupling 71 to the indexing pin 62, the tooth or lug 68 is withdrawn from the slot in the indexing ring 58 so that the entire tube 37 (Fig. 5) together with the cutter assembly unit 38 can rotate freely about the tube 18 until the desired position for the saw blade 54 has been effected, and then upon releasing the knob 72, the indexing pin 62 is again forced upwardly by the action of compression spring 67 to cause the tooth or lug 68 on the indexing pin 62 to enter the corresponding slot 59 in the indexing ring 58. The position of the saw blade is again locked and the saw is ready for use with the blade in its new position.

All of this can be accomplished while the operator of the saw unit is positioned behind the handle bars 35. The rotation of the saw blade to its new position is brought about by tilting the entire unit forwardly until the saw blade end of the machine engages the ground and then the entire saw unit is turned to the left or the right with respect to the person behind the handle bars while maintaining the saw blade end on the ground and while further tilting the saw unit forwardly until the desired angle has been reached by the saw blade. While the machine is thus held the indexing pin is returned to its locking position and the saw is then ready for use.

In Fig. 3 the saw blade 54 is shown in engagement with the ground in the broken line position illustrated at 54a and by manipulation of the entire saw unit in the manner just described, this blade can be moved by cooperation of the ground to the vertical position illustrated in this figure or to any other desired positions where it can be locked.

Referring to Fig. 8 the portable saw is shown on the side of a hill 75 in position to cut down a tree illustrated at 76. In this instance it is noted that in spite of the fact that the supporting wheels of the saw are disposed at different elevations the saw blade 54 is nevertheless in position to make a horizontal cut through the trunk of the tree. This position of the saw blade is brought about by proper indexing of the tube 37.

When it is desired to make a shallow cut, as for example, when notching a tree, a mere nudge of the machine into the tree is all that is required. A belt 77 fastened across the ends of the handle bars 35 as best shown in Fig. 2 is of particular advantage in such an instance. The operator of the machine can urge the machine forward with his body disposed against this belt. This is particularly desirable for notching a tree where only a shallow feed of the saw is required because of the resiliency afforded by the belt. This resiliency also reduces vibrations and shocks for the operator during normal operation of the saw if he applies the required pushing force with his body through the belt.

It is to be noted that the indexing sleeve assembly 57 is rigidly fixed with respect to the engine 23. This makes for sturdiness in the construction and operation of this assembly. The position of the saw blade 54 can easily and quickly be adjusted and locked independently of the position of the wheels 12. This is demonstrated by the two positions shown in Figs. 1 and 8 respectively where the wheels are disposed horizontally and at an inclination respectively, though in each instance the saw blade 54 is shown in a horizontal plane.

Referring to Fig. 1 the blade 54, even in its lowest position, is above the lowermost position of the wheels 12. Thus the saw may be wheeled over even rough ground without danger of striking the blade against the ground. To give additional clearance the blade 54 may be indexed to some higher position, such as that shown in Fig. 2 in broken lines.

I claim:

1. A saw comprising a wheeled support structure having a sleeve mounted thereon, a first tubular member telescoped inside said sleeve, secured thereto and extending rearwardly therefrom, said sleeve having a forward end portion of enlarged bore cooperating with said first tubular member to define an annular recess, a second tubular member extending forwardly from said sleeve and having one end journalled in said recess, an indexing ring secured to said second tubular member adjacent said sleeve, a clamping ring disposed over said indexing ring and secured to said sleeve to hold said second tubular member in position in said recess, a saw blade operatively mounted on the free end of said second tubular member, and means for rotating said blade.

2. A saw comprising a wheeled support structure, a first arm extending rearwardly from said support structure, a prime mover mounted on said first arm, a second arm journalled for rotation at one end in said structure and extending forwardly therefrom, a saw rotatably mounted on the free end of said second arm, drive means connecting said prime mover to said saw, a releasable locking means connected between said second arm and said support structure including an indexing ring secured to said second arm, and a clamping ring secured to said support structure and engaging said indexing ring to hold said second arm in position on said support structure.

3. In a portable power unit, the combination which comprises a hollow tubular frame mounted on wheels, an engine carried by said frame, handles operably connected to said frame, said frame having a forwardly extended section mounted for turning movement relative to remainder of said frame, a tool holding arbor carried by the outer end of said forwardly extended frame section, an index plate having spaced openings therein and mounted to be enclosed within said tubular frame, a spring actuated pin positioned to engage said index plate openings for securing said forwardly extended section and tool holding arbor in adjusted positions, means for forcing said spring actuated pin out of said index plate openings for turning said shaft and arbor, and drive shaft means extending within said hollow tubular frame for driving the arbor from the engine.

4. In a portable circle power saw unit, the combination which comprises a hollow frame mounted on wheels, an engine carried by said frame, handles operably connected to said frame, a forwardly extended hollow tubular member aligned with said hollow frame and mounted for turning movement on said frame, a tool holding arbor carried by the outer end of said tubular member, an index plate having spaced openings therein and mounted on said tubular member and enclosed therein, a spring actuated pin positioned to engage the said index plate openings for securing said tubular member and said tool holding arbor in adjusted positions, means for forcing said spring actuated pin out of said index plate openings for turning the said shaft and arbor, and means for extending within said hollow frame and said tubular member for driving said arbor from said engine.

ARTHUR W. MALL.

References Cited in the file of this patent

UNITED STATES PATENTS

| Number | Name | Date |
| --- | --- | --- |
| 752,763 | Donavin et al. | Feb. 23, 1904 |
| 910,145 | O'Hara | Jan. 19, 1909 |
| 1,513,469 | Robinson | Oct. 28, 1924 |
| 1,696,527 | Crumly | Dec. 25, 1928 |
| 1,858,015 | Hodgson | May 10, 1932 |
| 2,407,028 | McLean | Sept. 3, 1946 |
| 2,412,704 | Jaques | Dec. 17, 1946 |
| 2,435,192 | Arsneau | Feb. 3, 1948 |
| 2,477,677 | Woodling | Aug. 2, 1949 |
| 2,509,090 | Faccon | May 23, 1950 |

FOREIGN PATENTS

| Number | Country | Date |
| --- | --- | --- |
| 188,674 | Great Britain | Apr. 12, 1923 |
| 255,007 | Great Britain | July 15, 1926 |
| 115,148 | Australia | May 12, 1942 |